Figure 3:
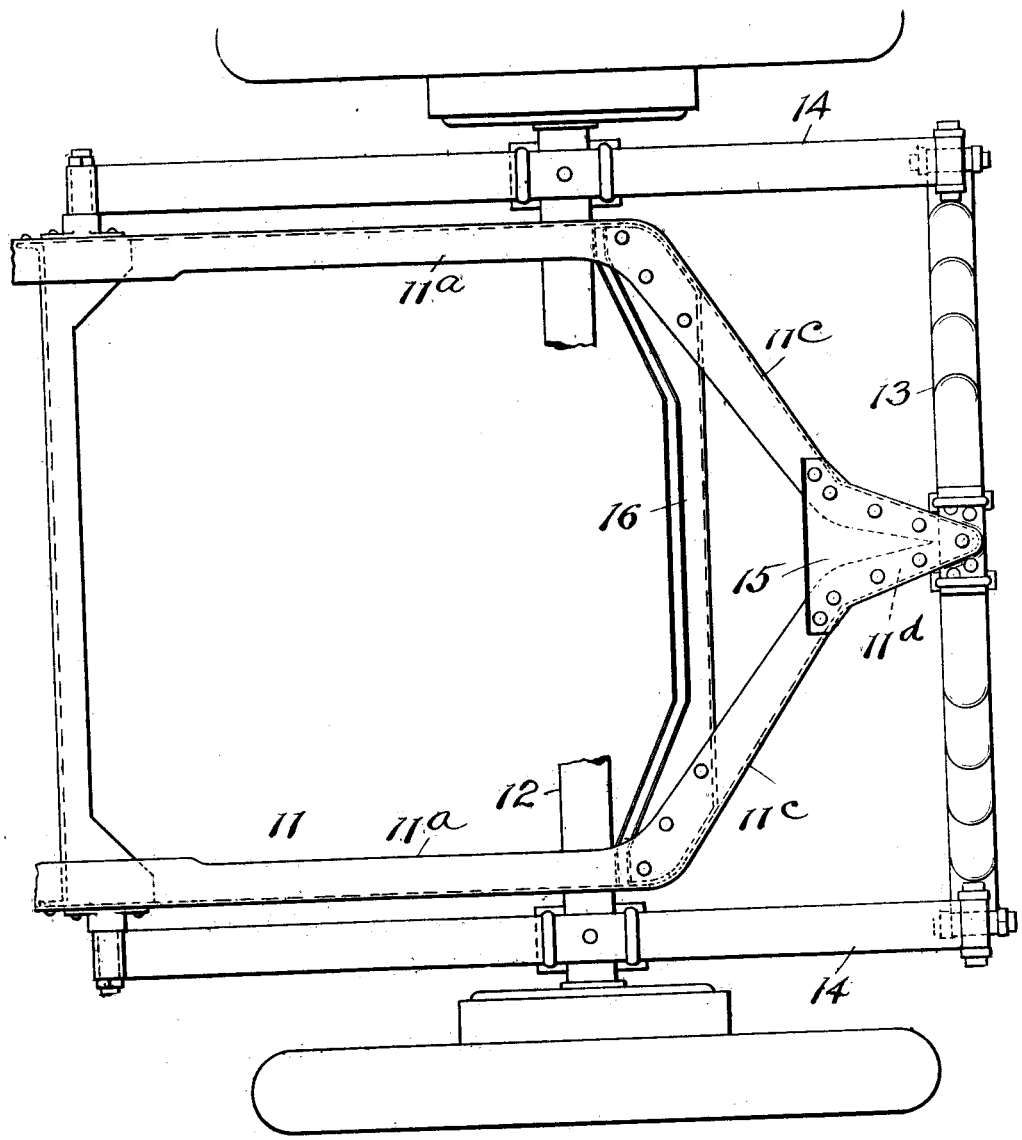

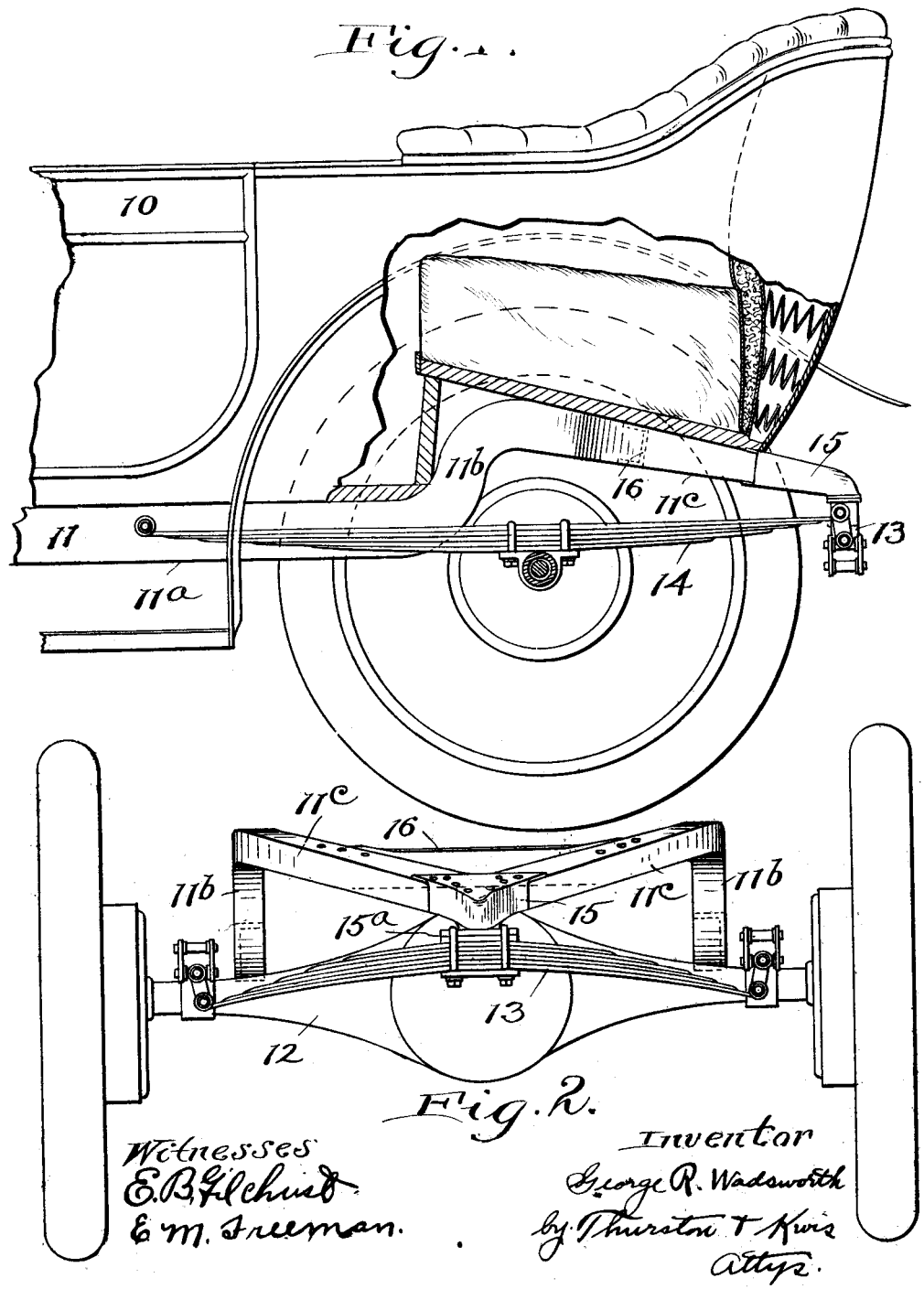

UNITED STATES PATENT OFFICE.

GEORGE R. WADSWORTH, OF CLEVELAND, OHIO, ASSIGNOR TO THE PEERLESS MOTOR CAR COMPANY, OF CLEVELAND, OHIO, A CORPORATION OF OHIO.

MOTOR-VEHICLE.

1,187,024.  Specification of Letters Patent.  Patented June 13, 1916.

Application filed July 15, 1912. Serial No. 709,415.

*To all whom it may concern:*

Be it known that I, GEORGE R. WADSWORTH, a citizen of the United States, residing at Cleveland, in the county of Cuyahoga and State of Ohio, have invented a certain new and useful Improvement in Motor-Vehicles, of which the following is a full, clear, and exact description.

This invention relates to motor vehicles and has for its main objects to provide certain improvements especially in the chassis and body, which improvements effect a material lowering of the body, and other desirable characteristics of the body; which provide a strong rigid frame and result in a direct saving in the amount of material required in the construction of the chassis frame, and permit of a more direct and satisfactory manner of attaching the platform spring to the frame than heretofore.

The above and other objects are accomplished by my invention which may be here briefly summarized as consisting of certain novel details of construction and combinations and arrangements of parts which will be described in the specification and set forth in the claims.

The preferred form of my invention is illustrated in the drawings, wherein—

Figure 1 is a side elevation of the rear portion of a motor vehicle equipped with my invention, parts being broken away, and parts being in section; Fig. 2 is a rear view of the same with the body removed; and Fig. 3 is a top plan view of the rear part of the chassis.

Referring now to the drawings, 10 represents the body of the vehicle, 11 the chassis frame of novel construction, and 12 the rear axle or axle casing which in this case is connected to the frame and body through the medium of a rear platform spring 13, (which is connected to the chassis frame in a novel manner to be explained,) and a pair of side springs 14, the forward ends of which are connected to the frame, and the rear ends of which are coupled to the ends of the rear platform spring 13 in the usual manner.

In motor vehicle constructions, the rear end of the chassis frame is usually rectangular in shape, and whether or not the frame is offset upwardly over the rear axle, the rear part of the frame is generally substantially horizontal. It is customary also to connect the platform spring to the rear end cross bar of the frame by means of a yoke or bracket, and to transmit the stresses to the side members of the frame by diagonally arranged brace bars extending forwardly and laterally to the side bars of the frame from the central rear part of the frame, or from the point of attachment of the spring supporting yoke or bracket.

In accordance with my invention, the frame at a point adjacent the rear axle and rearwardly thereof is so shaped that certain desirable characteristics of the body are obtained, including a lowering of the body, and an arrangement of the floor beneath the rear seat so as to obtain with a low floor a desirable depth of cushion at the rear part of the seat, and increased height of back panel of the body. Furthermore, in those cars wherein it is preferable to employ a rear platform spring, the frame is so shaped that the spring can be given a more direct attachment to the frame than heretofore, and at the same time rigidity is secured and economy of material effected.

Referring again to the drawings, it will be seen that the side bars 11ª of the frame are parallel for at least a portion of their length, and forwardly of the rear axle are quite low with respect to the rear axle casing 12, these side bars being channel-shaped in cross section, as is usual in automobile constructions. Just forwardly of the rear axle casing 12, the side bars are offset or bent upwardly over the rear axle casing, as shown at 11ᵇ, and thence the side bars, instead of extending rearwardly in a horizontal plane are from the highest point of the upwardly offset portions inclined downwardly to the rear end of the frame as shown at 11ᶜ. The rear part of the body conforms to the downward inclination of this part of the frame, the upwardly offset and the downwardly inclined portions being in fact beneath the rear seat of the body, the floor or bottom boards of said seat resting upon said inclined portions and therefore inclining downwardly from the front as shown. There are numerous advantages in this construction over those constructions wherein the rear parts of the frame and body extend from the rear axle in a horizontal direction, and among these advantages may be mentioned the following: The body as a whole is very low; a desirable depth of cushion can be obtained at the rear part of the rear seat without necessitating a high cushion or high seat floor; the cushion by reason of the downward inclination of the base is prevented from sliding forwardly, and the back panel of the body has greater height than is usually the case, thus adding to the appearance of the rear part of the body.

While the downward inclination of the frame and rear part of the body have the advantages above enumerated, in those cars where it is desirable to employ a platform spring, the frame is preferably otherwise improved in form and shape without losing any of the advantages previously mentioned. By reference particularly to Figs. 2 and 3, it will be seen that the downwardly inclined portions 11$^c$ of the side bars 11 of the frame, instead of extending rearwardly to the rear end of the frame in the same vertical planes with the forward portions of the side bars, also extend diagonally inward toward each other. The ends of the side bars meet at the rear of the frame on the longitudinal axis of the chassis, the rear ends of the bars shown at 11$^d$ being at a more acute angle or more nearly parallel to each other than the portions 11$^c$ forwardly thereof, thus providing a decided V at the rear central part of the chassis frame. At the apex of the converging part of the frame, or at the extreme rear ends of the side bars, the latter are secured together, and inclosed within a V-shaped member 15, which is provided with an integral base plate 15$^a$, (see Fig. 2), to which the rear platform spring 13 is directly secured. The inclosing and connecting member 15 which may be formed from properly cut and shaped plate material is securely riveted to the ends of both side members of the frame, as best shown in Fig. 3. Just at the rear of the rear axle, and near the junction of the parts 11$^b$ and 11$^c$, the two side members 11 are connected together by a channel shaped cross bar 16. By this construction, the rectangular rear corners usually in a chassis frame are eliminated, and by extending the side bars of the frame inwardly, as well as downwardly, and rearwardly from the rear axle so that the rear portions converge, less material is required in the construction of the frame, than would be the case if the rear end were rectangular. Furthermore, the V-shaped end provides for a more direct attachment of the rear platform spring to the frame than is the case with the present constructions, and the diagonally extending portions of the side bars transmit the stresses to the forward parts of the frame in the manner desired, and in the manner effected by the bracing bars of prior constructions.

Having thus described my invention, what I claim is:

1. In combination, an automobile chassis frame comprising side bars and cross bars connecting the side bars, the side bars having forward portions substantially horizontal, thence being bent upwardly so as to provide clearance for the rear axle casing, and thence being inclined downwardly from the upwardly bent portions to the rear end of the frame and a body supported on the chassis frame and extending over the rear inclined portion in conformity with the inclination thereof.

2. In an automobile, a chassis including a frame, a rear axle casing, a body supported on the frame, the side bars of said frame being bent upwardly over the rear axle and from the upwardly bent portions extending diagonally downward and rearward to the rear end of the frame, the floor of the rear part of the body being inclined in conformity with the inclination of the frame.

3. In an automobile, a chassis including a frame, a rear axle casing, a body supported on said frame, said frame including side bars which are substantially horizontal forwardly of the rear axle casing, and just in front of the rear axle casing are bent upwardly, and thence are inclined in substantially straight lines downwardly and rearwardly from the highest point of the upwardly bent portion to the rear end of the frame, said body having a rear seat, the floor of which is inclined downwardly from the front in conformity with the inclination of the rear part of the frame.

4. In an automobile chassis, a frame, a rear axle casing, and springs between the frame and rear axle casing, said frame comprising side bars which are substantially parallel forwardly of the rear axle casing, and rearwardly of the rear axle casing extend diagonally toward each other, said side bars being connected together and to one of said springs at the rear ends of said side bars at substantially the longitudinal center line of the chassis.

5. A chassis including a frame, a rear axle casing, and springs between the frame and axle casing, said frame including side bars which are parallel forwardly of the casing and rearwardly of the casing extend inwardly toward each other, and means securing the rear ends of the side bars together at substantially the longitudinal center line of the chassis.

6. A chassis frame comprising side bars which for a portion of their length are parallel and at the rear part of the frame are bent upwardly and thence extend diagonally rearward and inward toward each other, and have their rear ends connected together.

7. A chassis frame including side bars which at the rear part of the frame are bent upwardly and thence extend diagonally rearward and inward toward each other, the rearwardly and inwardly extending portions being downwardly inclined.

8. In an automobile chassis, a frame, a rear axle casing, said frame including side bars which are bent upwardly over the axle casing and thence extend diagonally rearward, downward, and inward toward each other, and means connecting together the extreme rear ends of said side bars adjacent the longitudinal center line of the chassis.

9. In an automobile chassis, a frame, a rear axle casing, springs supporting the rear part of the frame, from the axle casing and including a rear platform spring, said frame comprising side bars which at the rear of the axle casing converge forming substantially a V at the rear end of the frame, and the platform spring having a connection with the rear end of the frame.

10. In an automobile chassis, a frame, a rear axle casing, springs connecting the frame to the axle casing and including a rear platform spring, said frame including side bars which are bent upwardly over the axle casing and thence extend downwardly inwardly and rearwardly, the free ends being substantially at the center line of the frame and being connected together and to the platform spring.

11. In a motor vehicle, a frame, a rear axle casing, springs connecting the frame to the axle casing, a body including a rear seat supported on the frame, said frame including side bars which are bent upwardly over the axle casing and thence are inclined downwardly, inwardly and rearwardly toward the center line of the vehicle, the upwardly bent parts being beneath the rear seat, the base of which is inclined and rests upon the inclined portion of the frame.

12. In combination, an automobile chassis frame comprising side bars which are bent upwardly to provide clearance for the rear axle casing and rearwardly of the upwardly bent portions, being inclined downwardly, and a body supported by the chassis frame, the rear part of the body conforming to the upwardly bent and downwardly inclined portions of the chassis frame.

In testimony whereof, I hereunto affix my signature in the presence of two witnesses.

GEORGE R. WADSWORTH.

Witnesses:
A. F. KWIS,
A. J. HUDSON.